(12) United States Patent
Mori et al.

(10) Patent No.: US 6,505,662 B2
(45) Date of Patent: Jan. 14, 2003

(54) PNEUMATIC TIRE AND ASSEMBLY OF TIRE AND WHEEL

(75) Inventors: Shinichi Mori, Hiratsuka (JP); Hikomitsu Noji, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 31 days.

(21) Appl. No.: 09/780,472

(22) Filed: Feb. 12, 2001

(65) Prior Publication Data

US 2001/0017180 A1 Aug. 30, 2001

(30) Foreign Application Priority Data

Feb. 15, 2000 (JP) .......................... 2000-036662

(51) Int. Cl.$^7$ .................. B60C 15/00; B60C 15/024
(52) U.S. Cl. ...................... 152/539; 152/454
(58) Field of Search ................ 152/454, 539, 152/544

(56) References Cited

U.S. PATENT DOCUMENTS 5,868,190 A * 2/1999 Willard ................. 152/517

FOREIGN PATENT DOCUMENTS

| EP | 0531007 | * | 3/1993 |
| JP | 57151406 | * | 9/1982 |
| JP | 59124415 | * | 7/1984 |
| JP | 05185811 | * | 7/1993 |
| JP | 06001123 | * | 1/1994 |
| JP | 06312605 | * | 11/1994 |
| JP | 09020110 | * | 1/1997 |
| JP | 11192820 | * | 7/1999 |

* cited by examiner

Primary Examiner—Michael W. Ball
Assistant Examiner—Justin Fischer
(74) Attorney, Agent, or Firm—Rader, Fishman & Grauer PLLC

(57) ABSTRACT

A pneumatic tire of the present invention, which has a bead core buried in a bead portion, in which a ratio dw/D of an inner diameter dw of the bead core to a heel diameter D of a rim, which is specified in a public standard, and a ratio dt/D of a heel diameter dt of the bead portion to the heel diameter D of the rim satisfy the following inequalities:

$$1.009 < dw/D < 1.022$$

$$0.980 < dt/D < 0.996$$

4 Claims, 2 Drawing Sheets

PNEUMATIC TIRE AND ASSEMBLY OF TIRE AND WHEEL

BACKGROUND OF THE INVENTION

The present invention relates to a pneumatic tire and an assembly of a tire and a wheel. More particularly, the present invention relates to a tire and an assembly of a tire and a wheel, which are adapted to improve operationality for mounting a tire on a rim.

Heretofore, there has been proposed a pneumatic tire, in which a heel diameter of a bead portion is made slightly smaller than a heel diameter of a rim to tightly mount the bead portion on the rim, thus the bead portion is adapted not to fall off easily from the rim even if a high pressuring force is applied thereto due to an impact from the side and the like in addition to a large driving force or braking force during running.

However, with regard to such a pneumatic tire, since a mounting pressure in mounting the same on the rim is greatly increased, it takes time to mount the tire on the rim, thus causing a low rim-mounting operationality.

SUMMARY OF THE INVENTION

The object of the present invention is to provide a pneumatic tire and an assembly of a tire and a wheel, which are capable of improving operationality for mounting the tire on a rim while favorably maintaining a capability of the tire in resisting falling-off from the rim.

The pneumatic tire of the present invention for achieving the foregoing object, which has a bead core buried in a bead portion, is characterized in that a ratio dw/D of an inner diameter dw of the bead core to a heel diameter D of a rim, which is specified in a public standard, and a ratio dt/D of a heel diameter dt of the bead portion to the heel diameter D of the rim satisfy the following inequalities:

$1.009 < dw/D < 1.022$ $0.980 < dt/D < 0.996$

Meanwhile, the assembly of the tire and the wheel of the present invention for achieving the foregoing object, which comprises: a pneumatic tire having a bead core buried in a bead portion; and a wheel provided with a rim for attaching the bead portion of the tire, is characterized in that a ratio dw/D of an inner diameter dw of the bead core to a heel diameter D of the rim and a ratio dt/D of a heel diameter dt of the bead portion to the heel diameter D of the rim satisfy the following inequalities:

$1.009 < dw/D < 1.022$ $0.980 < dt/D < 0.996$

While the ratio dw/D of the inner diameter dw of the bead core to the heel diameter D of the rim is increased in the above-described manner, the ratio dt/D of the heel diameter dt of the bead portion to the heel diameter D of the rim is reduced, thus a thickness of a rubber interposed between the bead core and the rim is increased. Accordingly, in mounting the bead portion on the rim, it is possible to execute the mounting at a low pressure based on the elasticity of rubber. Moreover, after the mounting, in addition to frictional resistance between the rubber under the bead core and the rim, a high mounting force is obtained because the heel diameter dt of the bead portion is small, thus the falling-off of the bead from the rim is hard to occur. Accordingly, when the ratio dw/D and the ratio dt/D are set as described above, the operationality for mounting the tire on the rim can be improved while favorably maintaining the capability of the tire in resisting falling-off from the rim.

In the present invention, the rim applied to the pneumatic tire is a rim specified in a public standard (JIS, TRA and the like).

DETAILED DESCRIPTION OF THE PREFERRED EMBODIMENTS

Hereinbelow, a constitution of the present invention will be described in detail with reference to the accompanying drawings.

Figure 1:
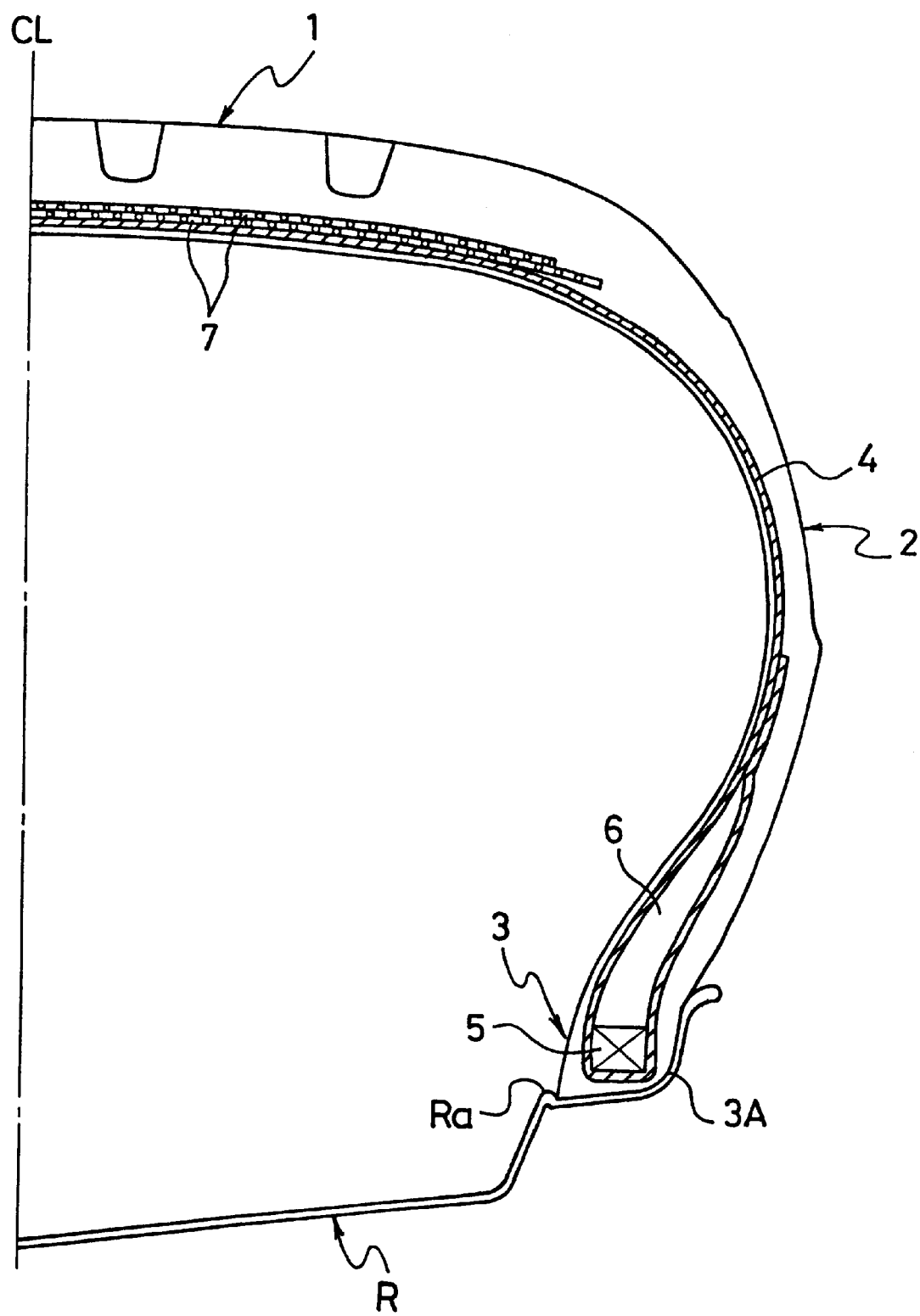
FIG. 1 is a half cross-sectional view taken along the meridian of a tire, showing a state where a pneumatic tire of an embodiment of the present invention is attached to a wheel.
Figure 2:
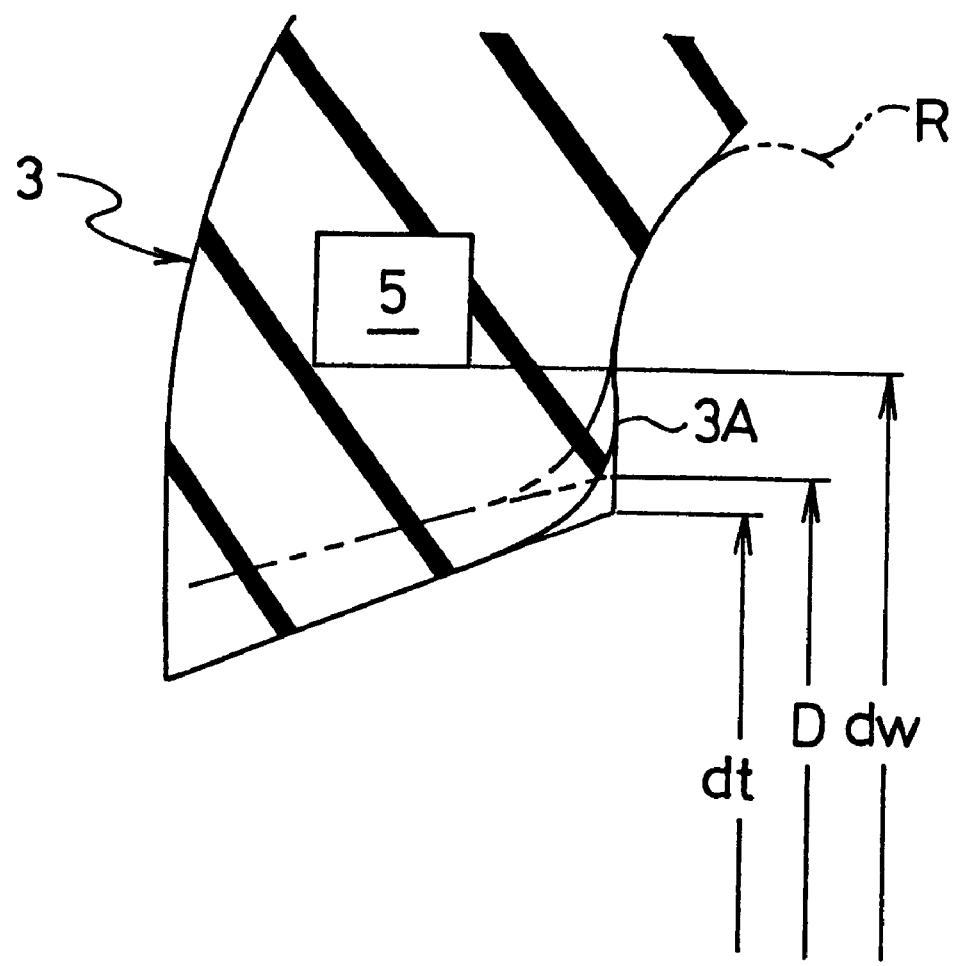
FIG. 2 is an enlarged cross-sectional view of a bead portion of FIG. 1 excluding a bead filler and a carcass layer.

FIG. 1 shows a state where a pneumatic tire according to an embodiment of the present invention is attached to a wheel, and FIG. 2 enlargedly shows a bead portion of the pneumatic tire. In the drawings, a reference numeral 1 denotes a tread portion, a numeral 2 a side wall portion; a numeral 3 a bead portion; and a reference code R denotes a rim of a wheel for attaching the tire bead portion thereto. A carcass layer 4 is laid between a pair of the bead portions 3 and 3, and both ends of the carcass layer 4 are folded back from the inside of the tire to the outside thereof around a bead core 5 buried in the bead portion 3 so as to sandwich a bead filler 6 therewith. A plurality of belt layers 7 are provided on the outer peripheral side of the carcass layer 4 in the tread portion 1. A reference code CL denotes a centerline.

As shown in FIG. 2, the heel diameter dt of the bead portion 3 is set smaller than the heel diameter D of the rim R, which is so-called a rim diameter, and the ratio dt/D is set in the range of: $0.980 < dt/D < 0.996$. Note that, when the bead portion 3 and the rim R are curved at a heel position, the heel diameter dt and the heel diameter D are specified with reference to a cross position of virtual outlines extended respectively from the bead portion 3 and the rim R, as shown in the drawing. Moreover, a ratio of the inner diameter dw of the bead core 5 to the heel diameter D of the rim R is set in a range of: $1.009 < dw/D < 1.022$. Specifically, a constitution is adopted such that a bead base of the bead portion 3 is pulled to an inner position in the tire diameter direction and that the bead core 5 is expanded to an outer position in the tire diameter direction as compared with the prior art.

The present inventors earnestly studied the mounting capability in mounting the tire on the rim R and the capability of the tire in resisting falling-off from the rim. As a result, the present inventors found out that it was extremely important to specify a relation between the heel diameter dt of the bead portion 3 and the heel diameter D of the rim R and a relation between the inner diameter dw of the bead core 5 functioning to fix the bead portion 3 to the rim R and the heel diameter D of the rim R.

Specifically, a hump portion Ra protrudes on the rim R as shown in FIG. 1. Only if a bead heel portion 3A can overpass this hump portion 3A, it can be facilely mounted on the rim thereafter. Therefore, in the present invention, the ratio dw/D of the inner diameter dw of the bead core 3 to the heel diameter D of the rim R is increased in the range of: $1.009<dw/D<1.022$ to separate the bead core 5 from the rim R as compared with the prior art. On the other hand, the ratio dt/D of the heel diameter dt of the bead portion 3 to the heel diameter D of the rim R is reduced in the range of: $0.980<dt/D<0.996$ to increase the thickness of the rubber interposed between the bead core 5 and the rim R. When the mounting force is made to greatly depend on the rubber in a compressed state in the above-described manner, in mounting the bead portion on the rim R, the bead heel portion 3A can easily overpass the hump portion Ra even at a low mounting pressure owing to the elasticity of rubber. Accordingly, the operationality for mounting the tire on the rim can be improved.

On the other hand, after the mounting, a tight mounting state of the bead portion to the rim R can be maintained while securing high frictional resistance between the rubber located at the inner position in the tire diameter direction from the bead core 5 and the rim R, thus the falling-off of the bead from the rim is hard to occur.

When the foregoing ratio dt/D is 0.980 or less, the heel diameter dt of the bead portion 3 becomes too small and the mounting is hard to be performed. On the contrary, when the ratio dt/D is 0.996 or more, the capability of the tire in resisting falling-off from the rim is deteriorated. This ratio dt/D is more preferably set in a range of: $0.985<dt/D<0.989$.

When the foregoing ratio dw/D falls to 1.009 or less, the inner diameter dw of the bead core 5 becomes too small, and it will be difficult to improve the mounting capability. On the contrary, when the ratio dw/D is 1.022 or more, the capability of the tire in resisting falling-off from the rim is deteriorated. This ratio dw/D is more preferably set in a range of: $1.013<dw/D<1.015$.

It is preferable that the present invention be particularly applied to a competition tire such as a cart tire having a nominal rim diameter of 5 inch, and a racing tire and a rally tire having a nominal rim diameter of 13 inch or more. However, the present invention can be used also for a pneumatic tire for a general passenger car.

EXAMPLE

There were made tires 1 to 3 of the present invention and comparative tires 1 and 2 having the ratio dt/D set at 0.987 and the ratio dw/D varied and a conventional tire having the ratio dt/D set at 0.998 and the ratio dw/D set at 1.005. All of the foregoing tires have a common size of 7.1×11.0–5.

Evaluation tests of the operationality for mounting the tire on the rim and the capability of the tire in resisting falling-off from the rim were performed for these test tires under measuring conditions to be shown below. Thus, results shown in Table 1 were obtained.

Operationality for mounting a tire on a rim:

A mounting pressure in mounting each test tire on a rim (rim width: 8 inch, heel diameter: 126.19 mm) was measured. Each evaluation result was shown with an index where that of the conventional tire is set at 100. As this index value becomes larger, the operationality for mounting the tire on the rim is more superior.

Capability of a tire in resisting falling-off from a rim:

Each test tire was attached to a rim (rim width: 8 inch, heel diameter: 126.19 mm), and under the condition of an air pressure of 100 kPa, a pressuring force was measured when the bead portion falls off from the rim by pushing each test tire from the side. Each evaluation result was shown with an index where that of the conventional tire is set at 100. As this index value becomes larger, the capability of the tire in resisting falling-off from the rim is more superior.

TABLE 1

|  | Conventional tire | Comparative tire 1 | Tire 1 of the present invention | Tire 2 of the present invention | Tire 3 of the present invention | Comparative tire 2 |
| --- | --- | --- | --- | --- | --- | --- |
| Ratio dw/D | 1.005 | 1.009 | 1.010 | 1.014 | 1.021 | 1.022 |
| Ratio dt/D | 0.998 | 0.987 | 0.987 | 0.987 | 0.987 | 0.987 |
| Operationality for mounting tire on rim | 100 | 99 | 103 | 105 | 108 | 109 |
| Capability of tire in resisting falling-off from rim | 100 | 101 | 103 | 104 | 101 | 98 |

Moreover, there were made tires 4 to 6 of the present invention and comparative tires 3 and 4 having the ratio dw/D set at 1.014 and the ratio dt/D varied and a conventional tire having the ratio dt/D set at 0.998 and the ratio dw/D set at 1.005. All of the foregoing tires have a common size of 7.1×11.0–5. Note that the tire 5 of the present invention is the same as the above-described tire 2 of the present invention.

Evaluation tests of the operationality for mounting the tire on the rim and the capability of the tire in resisting falling-off from the rim were performed for these test tires similarly to the foregoing manner. Thus, results shown in Table 2 were obtained.

TABLE 2

|  | Conventional tire | Comparative tire 3 | Tire 4 of the present invention | Tire 5 of the present invention | Tire 6 of the present invention | Comparative tire 4 |
| --- | --- | --- | --- | --- | --- | --- |
| Ratio dw/D | 1.005 | 1.014 | 1.014 | 1.014 | 1.014 | 1.014 |
| Ratio dt/D | 0.998 | 0.980 | 0.981 | 0.987 | 0.995 | 0.996 |
| Operationality for mounting tire on rim | 100 | 99 | 101 | 105 | 107 | 108 |
| Capability of tire in resisting falling-off from rim | 100 | 107 | 106 | 104 | 101 | 98 |

As apparent from these Tables 1 and 2, in each of the tires 1 to 6 of the present invention, the operationality for mounting the tire on the rim was improved by reducing the mounting pressure while favorably maintaining the capability of the tire in resisting falling-off from the rim.

As described above, according to the present invention, the inner diameter of the bead core and the heel diameter of the bead portion are specified by a relation of these diameters with the heel diameter of the rim. Thus, the operationality for mounting the tire on the rim can be improved, and the capability of the tire in resisting falling-off from the rim can be favorably maintained.

What is claimed is:

1. A pneumatic tire having a bead core buried in a bead portion, wherein a ratio dw/D of an inner diameter dw of said bead core to a heel diameter D of a rim, which is specified in a public standard, and a ratio dt/D of a heel diameter dt of said bead portion to the heel diameter D of said rim satisfy the following:

$$1.009 < dw/D < 1.022$$

and $$0.985 < dt/D < 0.989.$$

2. The pneumatic tire according to claim 1, wherein said ratio dw/D satisfies: $1.013 < dw/D < 1.015$.

3. An assembly of a pneumatic tire having a bead core buried in a bead portion and a wheel provided with a rim for attaching the bead portion of the tire, wherein a ratio dw/D of an inner diameter dw of said bead core to a heel diameter D of said rim and a ratio dt/D of a heel diameter dt of said bead portion to the heel diameter D of said rim satisfy the following:

$$1.009 < dw/D < 1.022$$

and $$0.985 < dt/D < 0.989.$$

4. The assembly of a tire and a wheel according to claim 3, wherein said ratio dw/D satisfies: $1.013 < dw/D < 1.015$.

* * * * *